(12) United States Patent
Becker et al.

(10) Patent No.: US 11,015,490 B2
(45) Date of Patent: May 25, 2021

(54) METHOD FOR OPERATING A COMBINED GAS AND STEAM POWER PLANT WITH STEAM HEATED BY AN EXOTHERMIC CHEMICAL REACTION

(71) Applicant: Siemens Aktiengesellschaft, Munich (DE)

(72) Inventors: Stefan Becker, Adelsdorf (DE); Vladimir Danov, Erlangen (DE); Uwe Lenk, Zwickau (DE); Florian Reißner, Nuremberg (DE); Erich Schmid, Nuremberg (DE); Jochen Schäfer, Nuremberg (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 285 days.

(21) Appl. No.: 15/766,130

(22) PCT Filed: Sep. 26, 2016

(86) PCT No.: PCT/EP2016/072836
§ 371 (c)(1),
(2) Date: Apr. 5, 2018

(87) PCT Pub. No.: WO2017/060111
PCT Pub. Date: Apr. 13, 2017

(65) Prior Publication Data
US 2018/0298787 A1    Oct. 18, 2018

(30) Foreign Application Priority Data
Oct. 7, 2015   (DE) .................. 10 2015 219 391.8

(51) Int. Cl.
*F01K 23/10*    (2006.01)
*F01K 1/04*    (2006.01)
(Continued)

(52) U.S. Cl.
CPC ............. *F01K 23/10* (2013.01); *F01K 1/04* (2013.01); *F01K 3/008* (2013.01); *F01K 3/14* (2013.01);
(Continued)

(58) Field of Classification Search
CPC ..... F01K 1/02; F01K 1/04; F01K 1/06; F01K 3/008; F01K 3/14; F01K 3/24; F01K 3/26–265; Y02E 60/14–145
See application file for complete search history.

(56) References Cited

U.S. PATENT DOCUMENTS 2,933,885 A * 4/1960 Vago ................... F28D 20/021
60/659
3,765,167 A * 10/1973 Rudolph ............... F01K 23/103
60/774
(Continued)

FOREIGN PATENT DOCUMENTS

DE    2824321 A1   11/1979   ............. F01K 17/00
DE    4025421 A1    2/1991   ............. F01K 23/10
(Continued)

OTHER PUBLICATIONS

Japanese Office Action, Application No. 2018517784, 8 pages, dated Oct. 8, 2019.
(Continued)

*Primary Examiner* — Laert Dounis
(74) *Attorney, Agent, or Firm* — Slayden Grubert Beard PLLC

(57) ABSTRACT

The present disclosure relates to combined gas and steam power plants. Various embodiments may include methods for operating such plants, such as: generating hot steam with an exhaust gas of a gas turbine; driving a generator with the steam; diverting at least a part of the generated steam and storing the diverted steam in a steam accumulator; then,
(Continued)

discharging at least a part of the steam stored in the steam accumulator from the steam accumulator; heating the steam discharged from the steam accumulator with heat released during an exothermic chemical reaction; and feeding the heated steam to drive the turbine device.

12 Claims, 1 Drawing Sheet

(51) Int. Cl.
    *F01K 3/00*              (2006.01)
    *F01K 3/14*              (2006.01)
    *F01K 3/18*              (2006.01)
    *F01K 13/02*            (2006.01)
    *F01K 3/24*              (2006.01)

(52) U.S. Cl.
    CPC ............. *F01K 3/188* (2013.01); *F01K 3/24* (2013.01); *F01K 13/02* (2013.01); *F01K 23/103* (2013.01); *F01K 23/105* (2013.01); *Y02E 20/16* (2013.01)

(56) References Cited

U.S. PATENT DOCUMENTS

| | | | | |
|---|---|---|---|---|
| 4,171,617 | A | * | 10/1979 | Sakamoto ................. F01K 3/12 60/641.8 |
| 4,274,256 | A | | 6/1981 | Kalt et al. .................. 60/39.182 |
| 5,127,470 | A | | 7/1992 | Inaba et al. ............. 165/104.12 |
| 5,148,668 | A | | 9/1992 | Frutschi ........................ 60/775 |
| 5,673,634 | A | | 10/1997 | Karger et al. ................ 110/234 |
| 9,509,026 | B2 | | 11/2016 | Lenk et al. |
| 2010/0175365 | A1 | * | 7/2010 | Ota ........................ F01K 23/10 60/39.181 |
| 2012/0216501 | A1 | | 8/2012 | Birley et al. ................. 60/39.12 |
| 2015/0337688 | A1 | * | 11/2015 | Dufosse .................... F01K 1/12 60/652 |
| 2016/0069218 | A1 | | 3/2016 | Lenk et al. ..................... 60/775 |
| 2016/0222832 | A1 | | 8/2016 | Lenk et al. ..................... 60/653 |
| 2018/0298788 | A1 | * | 10/2018 | Becker ...................... F01K 3/24 |

FOREIGN PATENT DOCUMENTS

| | | | | |
|---|---|---|---|---|
| DE | 102009051938 A1 | 5/2011 | ............ B01D 53/86 |
| DE | 102014202266 A1 | 8/2015 | ............ F01K 3/14 |
| EP | 0439754 A1 | 8/1991 | ............ F01D 19/00 |
| EP | 2256406 A2 | 12/2010 | ............ F01K 1/00 |
| EP | 2787197 A1 | 10/2014 | ............ F02C 3/30 |
| EP | 2796671 A1 | 10/2014 | ............ F01K 13/02 |
| JP | 562410 A | 1/1981 | ............ F01K 1/00 |
| JP | 58005415 A * | 1/1983 | ........... F01K 23/101 |
| JP | 58107803 A | 6/1983 | ............ F01K 3/02 |
| JP | 01273807 A | 11/1989 | ............ F01K 23/10 |
| JP | 04109036 A | 4/1992 | ............ F01K 23/10 |
| JP | 05340501 A * | 12/1993 | |
| JP | 08503060 A | 4/1996 | ............ F01K 23/10 |
| JP | 08260907 A | 10/1996 | ............ F01K 3/02 |
| JP | 11117713 A | 4/1999 | ............ F01K 23/10 |
| WO | 2014/026784 A1 | 2/2014 | ............ F02C 6/04 |
| WO | WO-2014173572 A2 * | 10/2014 | ........... F28D 20/003 |
| WO | 2015/043949 A1 | 4/2015 | ............ F01K 13/02 |
| WO | 2017/060111 A1 | 4/2017 | ............ F01K 1/04 |

OTHER PUBLICATIONS

Japanese Office Action, Application No. 2018517784, 8 pages, dated Jun. 4, 2019.
German Office Action, Application No. 102015219391.8. 7 pages, dated Mar. 18, 2016.
International Search Report and Written Opinion, Application No. PCT/EP2016/072836, 9 pages, dated Jan. 23, 2017.
Japanese Notice of Allowance, Application No. 2018-517784, 5 pages, dated Apr. 21, 2020.

* cited by examiner

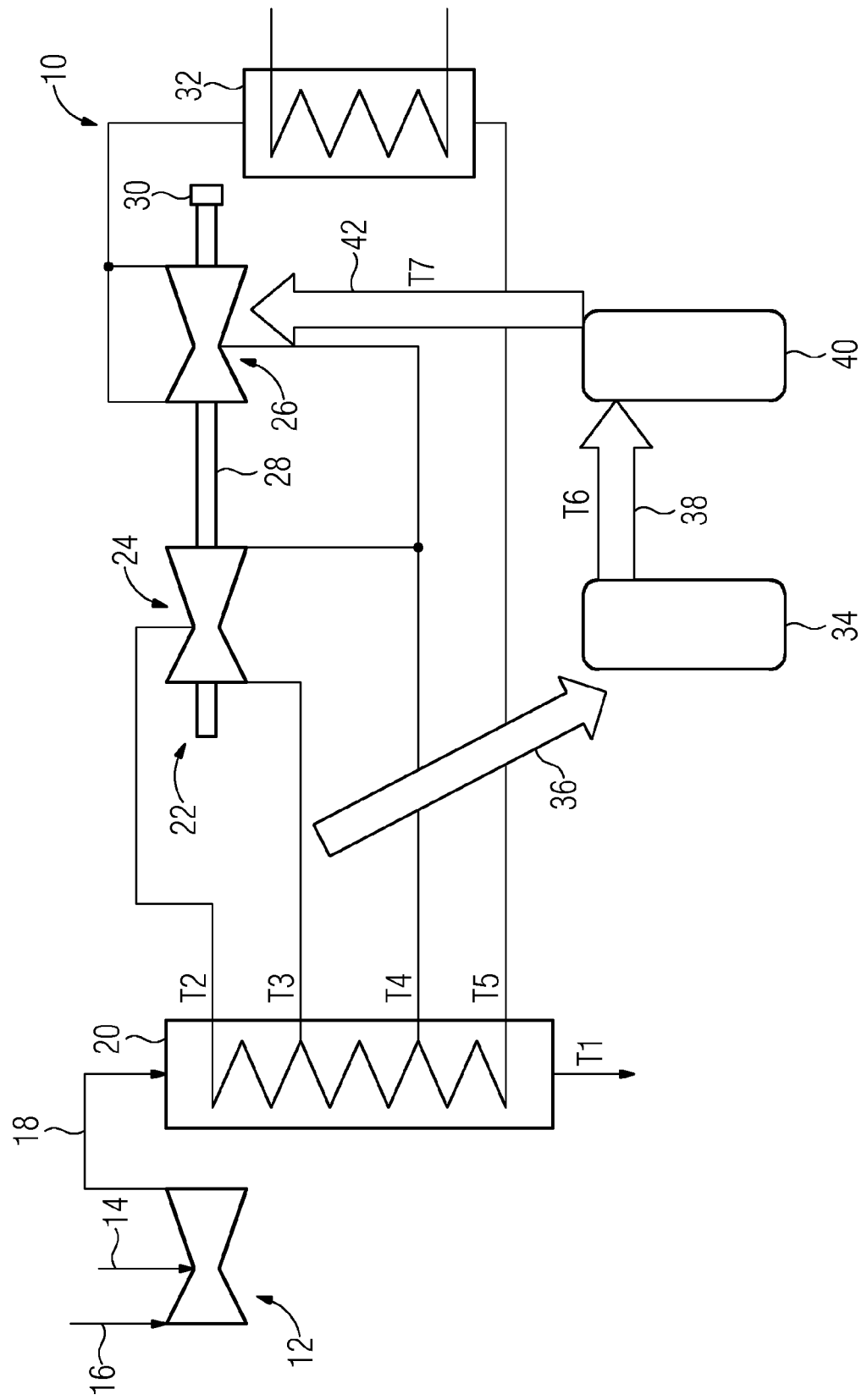

METHOD FOR OPERATING A COMBINED GAS AND STEAM POWER PLANT WITH STEAM HEATED BY AN EXOTHERMIC CHEMICAL REACTION

CROSS-REFERENCE TO RELATED APPLICATIONS

This application is a U.S. National Stage Application of International Application No. PCT/EP2016/072836 filed Sep. 26, 2016, which designates the United States of America, and claims priority to DE Application No. 10 2015 219 391.8 filed Oct. 7, 2015, the contents of which are hereby incorporated by reference in their entirety.

TECHNICAL FIELD

The present disclosure relates to combined gas and steam power plants. Various embodiments may include methods for operating such plants.

BACKGROUND

Various combined gas and steam power plants (COGAS power plant) are already widely known. The gas and steam power plant may be referred to as a combined cycle power plant, and may comprise at least one turbine device, at least one generator for providing electrical current driven by the turbine device, and at least one gas turbine. If the generator is driven by the turbine device, the generator can convert mechanical energy into electrical energy, or electrical current, and provide this electrical energy or the electrical current. The electrical current may then, for example, be fed into an electricity network.

The gas turbine in this case provides exhaust gas, by means of which hot steam is generated. For example, the gas turbine is supplied with a fuel, in particular a gaseous fuel, for example natural gas, the fuel being combusted by means of the gas turbine. In particular, in addition to the fuel, the gas turbine is supplied with oxygen or air, so that a fuel/air mixture is formed from the air and the fuel. This fuel/air mixture is combusted, as a result of which exhaust gas of the gas turbine is formed. By means of the exhaust gas, for example a liquid, in particular water, is heated and thereby vaporized, as a result of which hot steam is formed. This means that the hot steam is generated by means of the exhaust gas of the gas turbine by a liquid, for example water, being vaporized by means of the hot gas of the gas turbine.

The steam is supplied to the turbine device, so that the turbine device is driven by means of the steam. As already described, the generator is driven via the turbine device, or by means of the turbine device. The gas turbine, or its exhaust gas, is in this case used as a heat source for a downstream steam generator, by means of which the steam for the turbine device, or for driving the turbine device, is generated. The turbine device is therefore configured as a steam turbine.

It has been found that such a combined gas and steam power plant (COGAS power plant), in particular depending on the electricity demand, needs to be shut down so that the generator does not provide any electrical current and so that no current is fed into the electricity network by means of the COGAS power plant. Because of the shutdown the combined gas and steam power plant may cool, after which a restart or power-up of the combined gas and steam power plant requires a particularly long time and a particularly high energy demand. For this reason, provision is usually made to keep the combined gas and steam power plant hot during a time for which the combined gas and steam power plant is shut down. In this case, the combined gas and steam power plant is kept hot by means of steam. This steam for keeping it hot is conventionally generated by means of a boiler, in particular a gas boiler. By means of the boiler, a liquid, for example water, is vaporized, a fuel being used for this purpose. The steam generated by means of the boiler is delivered at least through a part of the combined gas and steam power plant to keep the latter hot or to heat it. The combined gas and steam power plant may then, after a shutdown thereof, be started in the scope of a hot start since the combined gas and steam power plant is then already at a sufficiently high temperature. With an increasing time for which the combined gas and steam power plant is shut down, however, an increasing amount of steam is required for keeping the combined gas and steam power plant hot, or heating it.

It is furthermore known to operate such a combined gas and steam power plant in different load ranges, in particular as a function of the electricity demand. For example, the combined gas and steam power plant may be operated in a full load range, or at full load, as well as a comparatively lower partial load range, i.e. at partial load. To change over from operation in the partial load range to operation in the full load range, the combined gas and steam power plant is stepped up from the partial load range to the comparatively higher full load range. In this case, a rapid step-up of the combined gas and steam power plant is desirable. The step-up is also referred to as powering up, power-up or ramp-up. This is intended to mean that a load at which the combined gas and steam power plant is operated is increased.

SUMMARY

The teachings of the present disclosure may allow rapid and energy-efficient step-up of the combined gas and steam power plant. For example, some embodiments may include a method for operating a combined gas and steam power plant (10), in which by means of exhaust gas of a gas turbine (12) hot steam is generated, by means of which at least one generator (30) for providing electrical current is driven via at least one turbine device (22), characterized by the steps of: diverting at least a part of the generated steam and storing the diverted steam in a steam accumulator (34); discharging at least a part of the steam stored in the steam accumulator (34) from the steam accumulator (34); heating the steam discharged from the steam accumulator (34) by means of heat which is released during an exothermic chemical reaction; and feeding the heated steam to the turbine device (22), which is driven by means of the heated steam supplied.

In some embodiments, products of an endothermic chemical reaction, which is carried out by means of heat, are used as reactants of the exothermic chemical reaction.

In some embodiments, the heat for carrying out the endothermic chemical reaction is obtained from at least a part of the steam generated by means of the exhaust gas.

In some embodiments, the heat from the part of the steam is transferred to reactants of the endothermic chemical reaction in order to carry out the endothermic reaction.

In some embodiments, the turbine device (22) is supplied with the heated steam for driving the turbine device (22) in order to step up the combined gas and steam power plant (10) from a first load range to a second load range, which is higher than the first load range.

In some embodiments, the endothermic chemical reaction is carried out in the second load range.

As another example, some embodiments may include a combined gas and steam power plant (10), which is configured for carrying out a method as described above.

BRIEF DESCRIPTION OF THE DRAWINGS

Further advantages, features, and details may be found in the following description of an exemplary embodiment and with the aid of the drawing. The features and feature combinations mentioned above in the description, as well as the features and feature combinations mentioned below in the description of the FIGURE and/or merely shown in the single FIGURE may be used not only in the combination respectively indicated, but also in other combinations or separately, without departing from the scope of the invention.

In the single FIGURE, the drawing shows a schematic representation of a combined gas and steam power plant, which can be stepped up particularly rapidly and favorably in terms of energy with the aid of heat which is released during an exothermic chemical reaction.

DETAILED DESCRIPTION

In some embodiments, a method includes diverting at least a part of the steam generated by means of the gas turbine, or by means of the exhaust gas of the gas turbine. The diverted steam, that is to say the diverted part of the steam, is stored in a steam accumulator, in particular a Ruths accumulator. The Ruths accumulator is a steam accumulator which, for example, has a storage region that is partially filled with boiling water. This means that at least a first subregion of the accumulator container is filled with boiling water. A second subregion, different to the first subregion, of the accumulator container is filled with water vapor that is at the same temperature as the boiling water. If steam is then taken from the accumulator container, re-evaporation takes place, so new steam or water vapor is formed from the boiling water. The heat required for this comes from the boiling water.

In some embodiments, at least a part of the steam stored in the steam accumulator is discharged from the steam accumulator. In some embodiments, the steam discharged from the steam accumulator is heated by means of heat which is released during an exothermic chemical reaction. In other words, an exothermic chemical reaction gives off heat released in the scope of the exothermic chemical reaction. The heat released in the scope of the exothermic chemical reaction is used to heat and/or superheat the steam discharged from the steam accumulator. The steam heated by means of the heat released during the exothermic chemical reaction is fed to the turbine device, which is driven by means of the heated steam supplied. With the aid of the heat released during the exothermic chemical reaction, the steam can be heated particularly favorably in terms of energy and thereby brought to a parhigh temperature, so that the turbine device can be driven effectively by means of the heated steam.

In some embodiments, the turbine device may be accelerated by means of the heated steam, so that the combined gas and steam power plant can be rapidly stepped up with the aid of the heated steam supplied to the turbine device, and thereby brought from a first load range into a second load range, which is higher than the first load range. In this way, particularly efficient and therefore energy-favorable operation of the combined gas and steam power plant can be achieved overall.

In some embodiments, products of an endothermic chemical reaction, which is carried out by means of heat, are used as reactants of the exothermic chemical reaction.

In some embodiments, the heat for carrying out the endothermic chemical reaction is obtained from at least a part of the steam generated by means of the exhaust gas.

In some embodiments, the heat from the part of the steam is transferred to reactants of the endothermic chemical reaction in order to carry out the endothermic reaction.

In some embodiments, the turbine device is supplied with the heated steam for driving the turbine device in order to step up the combined gas and steam power plant from a first load range to a second load range, which is higher than the first load range.

In some embodiments, the endothermic chemical reaction is carried out in the second load range.

In some embodiments, a combined gas and steam power plant is configured for carrying out a method as described above. Various configurations of the method from above are to be regarded as variation of the combined gas and steam power plant according to the present disclosure and vice versa.

In a schematic representation, the single FIGURE shows a combined gas and steam power plant denoted overall by 10, which is also referred to as a COGAS power plant or—for better readability—as a power plant. The power plant comprises at least one gas turbine 12, which is for example supplied with fuel for operating the power plant. This supply of fuel to the gas turbine 12 is illustrated in the FIGURE by a direction arrow 14. The fuel may comprise a gaseous fuel, for example natural gas. The gas turbine 12 is furthermore supplied with air, this being illustrated in the FIGURE by a direction arrow 16.

The fuel is combusted by means of the gas turbine 12, forming exhaust gas. The gas turbine 12 therefore provides the exhaust gas, this being illustrated in the FIGURE by a direction arrow 18. For example, a mixture of the fuel and the air is formed in the gas turbine 12, this mixture being combusted. As a result of this, the exhaust gas of the gas turbine 12 is formed.

With the aid of the direction arrow 18, it can be seen that the exhaust gas is supplied to a steam generator 20 of the power plant. The steam generator 20 may comprise a boiler or evaporator. The steam generator 20 is furthermore supplied with a liquid, e.g. water. In this case, heat transfer takes place from the exhaust gas of the gas turbine 12 to the water, so that the water is heated and vaporized. Steam is therefore generated from the water. This means that steam is generated by means of the exhaust gas of the gas turbine 12, and by means of the steam generator 20, from the water (liquid) supplied to the steam generator 20. As a result of this heat transfer from the exhaust gas to the water, the exhaust gas is cooled, so that it is for example discharged from the steam generator 20 at a first temperature T1. The first temperature T1 may be, for example, at least substantially 90° C. (degrees Celsius).

The power plant furthermore comprises a turbine device, denoted overall by 22, which in the present case comprises a first turbine 24 and a second turbine 26. The turbine 24 may comprise a high-pressure turbine, the turbine 26 may comprise a medium-pressure and low-pressure turbine. The steam, generated by means of the exhaust gas of the gas turbine 12 and with the aid of the steam generator 20, is supplied to the turbine device 22, so that the turbine device 22, in particular the turbines 24 and 26, are driven by means of the generated steam. By means of the hot steam turbine device 22, energy contained in the hot steam is converted into mechanical energy, the mechanical energy being provided via a shaft 28. The turbine device 22 may comprise turbine wheels (not represented in detail in the FIGURE), to which the steam is supplied. The turbine wheels are therefore driven by means of the steam. The turbine wheels are for example connected in a rotationally fixed fashion to the shaft 28, so that the shaft 28 is driven by the turbine wheels when the turbine wheels are driven by means of the steam.

In some embodiments, the power plant 10 comprises at least one generator 30, which can be or is driven via the shaft 28 of the turbine device 22. The generator 30 is therefore supplied with the mechanical energy provided via the shaft 28, at least a part of the supplied mechanical energy being converted into electrical energy, or electrical current, by means of the generator 30. The generator 30 can provide this electrical current, which may for example be fed into an electricity network.

The steam is discharged from the turbine device 22 and supplied to a heat exchanger 32, which may comprise a condenser. The steam is cooled by means of the heat exchanger 32, so that the steam condenses. In this way, the steam again becomes the aforementioned water, which may be supplied again to the steam generator 20.

In order for the steam to be cooled by means of the heat exchanger 32, the heat exchanger 32 is for example supplied with a coolant, in particular a cooling liquid. Heat transfer may in this case take place from the steam to the cooling liquid, so that the steam is cooled and consequently condenses.

In some embodiments, the power plant comprises a multiplicity of lines (not represented in detail in the FIGURE), through which respective flows of the steam generated by means of the exhaust gas of the gas turbine 12 flow. These flows may be at different temperatures. Different temperatures T2, T3 and T4 of the steam generated by means of the exhaust gas of the gas turbine 12 are represented in the FIGURE, temperature T2 being for example 595° C., temperature T3 360° C., and temperature T4 240° C. The water leaves the condenser at for example a temperature T5, which is for example 40° C.

As a function of the electricity demand, the power plant may be operated in a first load range and in a second load range, which is higher than the first load range. The second load range is for example a full load range, in which the power plant is operated at full load, or under full load. This, for example, is the case for a high electricity demand. If the electricity demand is low, the power plant is for example operated in the first load range, which is lower than the full load range. If the electricity demand increases, it is necessary to bring the power plant from the first load range into the second load range. To this end, the power plant is stepped up. In other words, the power plant is operated at a first load in the first load range, and in the second load range at a second load which is higher than the first load. Both loads are, however, greater than 0. This means that the power plant is activated, or turned on, in both load ranges.

During the step-up of the power plant, the turbine device 22, in particular the shaft 28, may be accelerated. This means that the turbine device 22, in particular the shaft 28, rotates in the first load range for example with a first rotational speed, the turbine device 22, in particular the shaft 28, rotating in the second load range at a second rotational speed which is higher than the first rotational speed. The turbine device 22 therefore provides a greater amount of mechanical energy via the shaft 28 in the second load range, so that the generator 30 provides a greater amount of electrical current in the second load range compared with the first load range.

To accelerate the turbine device 22, or the shaft 28, it is necessary for a greater amount of steam to be provided by means of the steam generator 20 in the second load range compared with the first load range. To this end, the gas turbine 12 provides a greater amount of exhaust gas in the second load range compared with the first load range. The gas turbine 12 itself can be stepped up particularly rapidly and simply. The steam generator 20, however, or the amount of steam which can be generated by means of the steam generator 20, lags behind the gas turbine 12 since the gas turbine 12 can be stepped up more rapidly than the steam generation to be carried out by means of the steam generator 20.

To allow a particularly energy-favorable and rapid step-up of the power plant, the power plant 10 may comprise a steam accumulator in the form of a Ruths accumulator 34 for storing steam. A direction arrow 36 indicates that at least a part of the steam generated by means of the exhaust gas of the gas turbine 12, and by means of the steam generator 20, is diverted. This diverted steam, or the diverted part of the steam generated by means of the exhaust gas of the gas turbine 12, is supplied to the Ruths accumulator 34 and stored in the Ruths accumulator 34. This is done, in particular, during the first load range and/or during the second load range.

A direction arrow 38 illustrates that at least a part of the steam stored in the Ruths accumulator 34 is discharged from the Ruths accumulator 34. The steam discharged from the Ruths accumulator 34 is, for example, at a sixth temperature T6 and a pressure of 38 bar. The sixth temperature T6 is, for example, 250° C. (degrees Celsius). The steam discharged from the Ruths accumulator 34 is supplied to a reactor 40 of the power plant. In the reactor 40, the steam discharged from the Ruths accumulator 34 is heated by means of heat which is released during an exothermic chemical reaction, so that the steam downstream of the reactor 40 is, for example, at a seventh temperature T7 which is higher than the sixth temperature T6. Preferably, the temperature T7 is 450° C., the steam downstream of the reactor 40 being for example at a pressure of 38 bar.

In the FIGURE, a direction arrow 42 illustrates that the steam heated by means of the reactor 40 is delivered to the turbine device 22. In particular the steam is delivered to the turbine 26, and in particular to the medium-pressure turbine, so that the turbine device 22 may be driven by means of the steam heated, in particular superheated, by means of the reactor 40. Because the turbine device 22 is driven by means of the steam generated in the reactor 40, the turbine device 22, in particular the shaft 28, is accelerated, so that the power plant—as described above—can be stepped up from the first load range into the second load range.

In some embodiments, products of an endothermic chemical reaction are used as reactants of the exothermic chemical reaction, the endothermic chemical reaction being carried out by means of heat. This means that the exothermic chemical reaction is, for example, a reverse reaction of a chemical equilibrium reaction. The endothermic chemical reaction may be a forward reaction of the chemical equilibrium reaction. The forward reaction absorbs heat, wherein said heat is supplied to the forward reaction or to the reactants of the forward reaction. Products of the forward reaction are generated from the reactants of the forward reaction. Said products of the forward reaction (endothermic chemical reaction) are reactants of the reverse reaction (exothermic chemical reaction).

In some embodiments, products of the reverse reaction are formed from the reactants of the reverse reaction. Said products of the reverse reaction can be used as reactants of the forward reaction. The heat that has been supplied to the reactants of the forward reaction is thus stored in the products of the forward reaction to carry out the forward reaction. In this way, energy can be stored and used for subsequent purposes or at a later point in time, in particular in the start-up of the power plant. For example, it is possible for the heat for carrying out the forward reaction to be supplied to the reactants of the forward reaction during the first load range and/or during the second load range.

During the start-up, the reverse reaction takes place, so that heat is released, by means of which the steam discharged from the Ruths accumulator 34 is heated and/or superheated. In some embodiments, the heat for carrying out the endothermic chemical reaction (forward reaction) is obtained from at least a part of the steam generated by means of the exhaust gas of the gas turbine. In some embodiments, it is conceivable to transfer the heat from the part of the steam to reactants of the forward reaction, to carry out the forward reaction. For example, heat may be transferred from at least a part of the steam generated by means of the gas turbine 12, or by means of exhaust gas of the gas turbine 12, via at least one heat exchanger to the reactants of the endothermic chemical reaction. In this way, the endothermic chemical reaction is carried out, so that at least a part of the heat supplied to the reactants is stored in the products of the endothermic chemical reaction.

In the reverse reaction (exothermic chemical reaction), the heat stored in the products of the forward reaction may be released to superheat the steam discharged from the Ruths accumulator 34. The heat released, or becoming free, in the scope of the exothermic chemical reaction is supplied to the steam discharged from the Ruths accumulator 34, for example via a heat exchanger, so that the steam discharged from the Ruths accumulator 34 can be heated effectively and rapidly.

In some embodiments, there is a heat transfer from steam to the reactants of the forward reaction and/or a transfer of the heat released in the scope of the reverse reaction to the steam discharged from the Ruths accumulator 34 directly, that is to say without the intermediary of a heat exchanger. For example, the respective steam then comes into contact with the reactants of the forward reaction, or the reactants and/or products of the reverse reaction, the steam flowing onto or around the reactants of the forward reaction, or the reactants and/or products of the reverse reaction. By the use of a heat exchanger, it is possible to achieve spatial separation of the steam from the reactants of the forward reaction, or the reactants and/or products of the reverse reaction, so that the steam does not come directly into contact with the reactants of the forward reaction, or the reactants and/or products of the reverse reaction.

In some embodiments, the steam supplied to the Ruths accumulator 34 may have a mass flow rate of 21.4 kg/s, a pressure of 38 bar, and a temperature of 334° C. In the Ruths accumulator 34, the stored steam may be, for example, at a temperature of 250° C. In some embodiments, the steam supplied to the turbine device 22 to drive the turbine device 22 may have, for example, a mass flow rate of 25 kg/s (kilograms per second). Initially, the steam discharged from the Ruths accumulator 34 is, downstream of the Ruths accumulator 34 and upstream of the reactor 40, for example at a temperature of 250° C. By means of the heat released in the scope of the reverse reaction, the steam in the reactor 40 is heated for example to 450° C.

In some embodiments, the heat for carrying out the endothermic chemical reaction is obtained from at least a part of the exhaust gas of the gas turbine 12. In some embodiments, the heat for carrying out the endothermic chemical reaction is obtained from at least a part of the exhaust gas of the gas turbine 12 flowing out of the steam generator 20. In this way, the exhaust gas of the gas turbine 12 downstream of the steam generator 20, may be used in order to carry out the endothermic reaction. The transfer of the heat from the exhaust gas of the gas turbine 12 to the reactants of the forward reaction may, for example, be carried out in the manner explained above in connection with the steam generated by means of the gas turbine 12.

The reverse reaction may take place in the reactor 40. The forward reaction may furthermore take place in the reactor 40. In some embodiments, an endothermic reactor is used for the forward reaction, in which case for example an exothermic reactor is used for carrying out the reverse reaction. With the aid of the forward reaction, or the products of the forward reaction, in cooperation with the reactor 40 a thermochemical accumulator is provided, in which it is possible to store in the described way heat which is available anyway. This thermochemical accumulator may be a supplement to the Ruths accumulator 34 functioning as a steam accumulator, by means of the thermochemical accumulator to heat the steam discharged from the Ruths accumulator 34 with the aid of the reverse reaction.

What is claimed is:

1. A method for operating a combined gas and steam power plant, the method comprising:
   generating steam with an exhaust gas of a first gas turbine;
   using a first portion of the steam to drive a generator for providing electrical current with a second turbine;
   diverting a second portion of the generated steam and storing the second portion of the steam in a steam accumulator;
   discharging at least a portion of the second portion of the steam stored in the steam accumulator from the steam accumulator;
   heating the at least a portion of the second portion of the steam with heat released during an exothermic chemical reaction; and
   feeding the at least a portion of the second portion of steam after heating to drive the second turbine.

2. The method as claimed in claim 1, further comprising using products of an endothermic chemical reaction as reactants of the exothermic chemical reaction.

3. The method as claimed in claim 2, further comprising obtaining heat for the endothermic chemical reaction from at least a part of the steam generated by the exhaust gas.

4. The method as claimed in claim 3, further comprising transferring heat from the part of the steam to reactants of the endothermic chemical reaction to carry out the endothermic reaction.

5. The method as claimed in claim 1, further comprising supplying the second turbine with the at least a portion of the second portion of steam after heating for driving the turbine device to step up the combined gas and steam power plant from a first load range to a second load range with a higher load than the first load range.

6. The method as claimed in claim 5, further comprising using products of an endothermic chemical reaction as reactants of the exothermic chemical reaction;
   wherein the endothermic chemical reaction is carried out in the second load range.

7. A combined gas and steam power plant comprising:
a gas turbine generating an exhaust gas;
a steam generator using the exhaust gas to provide steam;
a generator for providing electrical current with a turbine device driven by a first portion of the steam; and
a steam accumulator diverting and storing at least a second portion of the steam from the steam generator;
wherein the steam accumulator discharges at least a part of the second portion of the steam stored therein; and
a reactor for an exothermic chemical reaction to heat the at least a part of the second portion of the steam;
wherein the at least a part of the second portion of steam after heating is used to drive the turbine device.

8. The plant as claimed in claim 7, wherein products of an endothermic chemical reaction are used as reactants of the exothermic chemical reaction.

9. The plant as claimed in claim 8, wherein heat from at least a part of the steam generated by means of the exhaust gas is used for the endothermic chemical reaction.

10. The plant as claimed in claim 9, wherein heat from the part of the steam is transferred to reactants of the endothermic chemical reaction to carry out the endothermic reaction.

11. The plant as claimed in claim 8, wherein the turbine device is supplied with the heated steam for driving the turbine device to step up the combined gas and steam power plant from a first load range to a second load range with a higher load than the first load range.

12. The plant as claimed in claim 11, wherein the endothermic chemical reaction is carried out in the second load range.

\* \* \* \* \*